United States Patent [19]

Koneval

[11] 4,299,130
[45] Nov. 10, 1981

[54] THIN FILM STRAIN GAGE APPARATUS WITH UNSTRAINED TEMPERATURE COMPENSATION RESISTANCES

[75] Inventor: Donald J. Koneval, Arlington Heights, Ill.

[73] Assignee: Gould Inc., Rolling Meadows, Ill.

[21] Appl. No.: 86,642

[22] Filed: Oct. 22, 1979

[51] Int. Cl.³ .............................................. G01B 7/20
[52] U.S. Cl. ..................................................... 73/766
[58] Field of Search ............. 73/766; 338/3, 9, 22 SD

[56] References Cited

U.S. PATENT DOCUMENTS 3,303,693  2/1967  Stedman ................................ 73/766
4,104,607  8/1978  Jones .................................... 338/9 X
4,173,148  11/1979  Yamada et al. ........................ 73/766
4,174,639  11/1979  Raven ................................... 73/766

Primary Examiner—Jerry W. Myracle
Attorney, Agent, or Firm—Charles E. Snee, III; Harold Huberfeld

[57] ABSTRACT

A thin film strain gage transducer includes temperature compensation resistances on an unstrained portion of the flexure element of the transducer. The compensation resistances are formed of the same material as the electrical leads interconnecting the strain gage resistances and also are deposited simultaneously with the electrical leads during manufacture.

6 Claims, 3 Drawing Figures

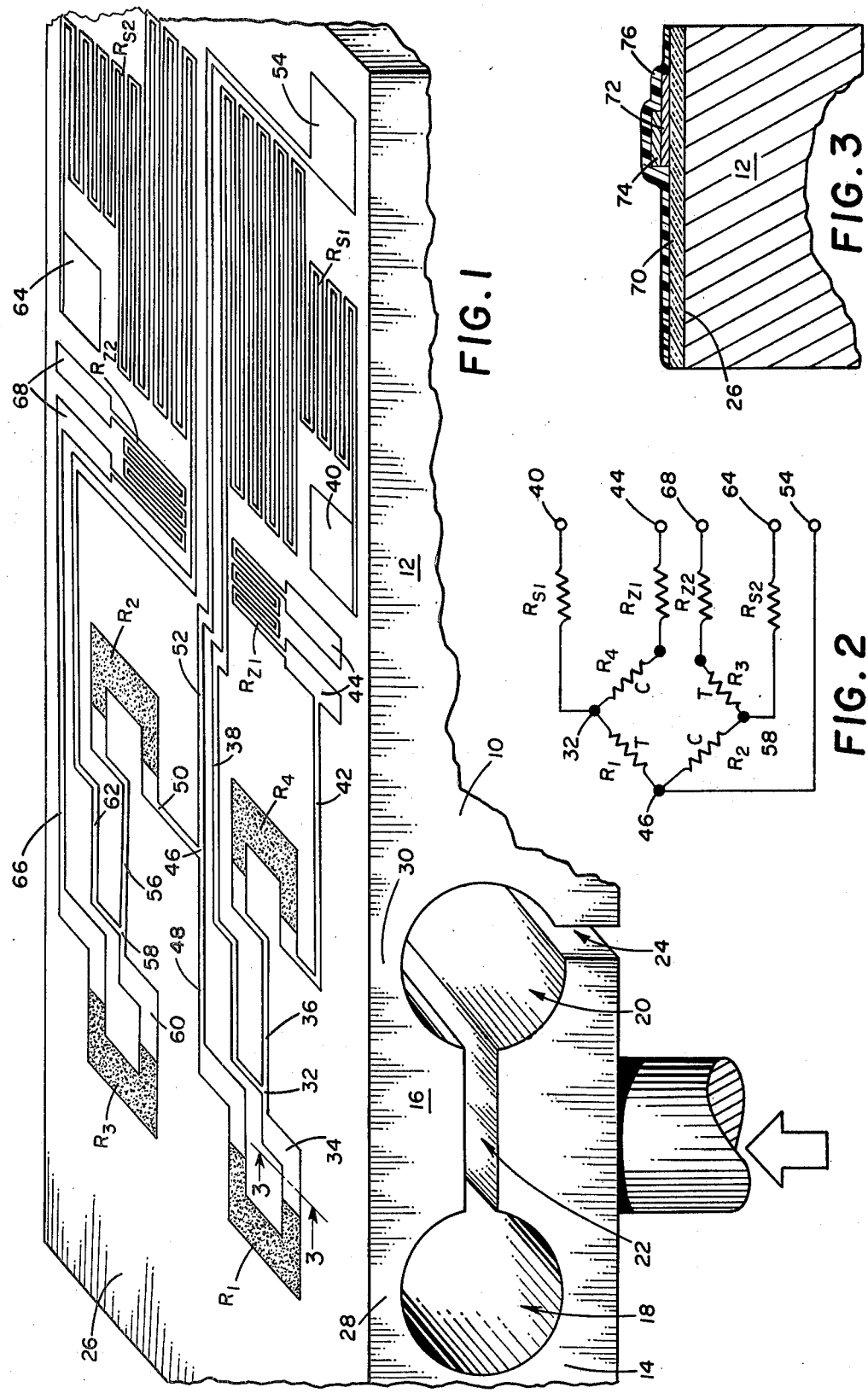

THIN FILM STRAIN GAGE APPARATUS WITH UNSTRAINED TEMPERATURE COMPENSATION RESISTANCES

CROSS REFERENCE TO RELATED APPLICATIONS

This application is related to U.S. Ser. No. 930,338 for Strain Gage Circuit Connections, filed Aug. 2, 1978 by Walter H. Eisele, Ronald P. Helin and Donald J. Koneval, and assigned to the same assignee as the present application, and now abandoned; and to Ser. No. 093,834 for Method of Forming a Thin Film Sensor Structure, filed Nov. 13, 1979 by Donald J. Koneval and commonly assigned.

BACKGROUND OF THE INVENTION

Force transducers embodying thin film strain gage resistance bridges have been in use for many years. Typically, the gages are provided on a flexure element which deforms in response to an applied force. In such cases, temperature effects may cause unequal expansion of the legs of the bridge even when no actual force is being applied. This causes a shift in the zero point of the bridge since an output will be produced even when no force is applied. Similarly, temperature effects may result in differential changes in the elasticity or spring constant of various parts of the transducer, so that a given deflection of the flexure element will cause different bridge outputs as the temperature varies. This causes a shift in the span of the bridge, also known as the gage factor or sensitivity.

Various approaches to compensation for temperature effects have been followed in the past. Bodner et al disclosed in U.S. Pat. No. 2,930,224 a type of temperature compensating strain gage in which a strain-insensitive thermocouple is used to generate a current flow opposite to that flowing in the gage resistance in order to cancel out temperature effects. The temperature compensating elements, however, are located on the strained portion of the flexure element and therefore in fact are subject to resistance variations due to applied strain. Starr also disclosed in U.S. Pat. No. 3,034,346 a technique for compensation of strain gage nonlinearity in which the compensating resistances are placed on the strained portion of the flexure element. Billette et al shown in U.S. Pat. No. 3,886,799 a type of semiconductor pressure transducer in which compensating elements are provided on the flexure element with the strain gage bridge.

While these prior art devices have achieved a measure of success in compensating for temperature effects, the location of the compensating elements on the strained portion of the flexure element causes resistance variations due to strain which tend to interfere with the desired function of the compensating elements: the minimization of temperature effects. Moreover, due to the complicated procedures by which prior art thin film strain gage transducers have been made, manufacturing time has been rather long and cost high.

OBJECTS OF THE INVENTION

An object of the invention is to provide an improved thin film strain gage transducer having provision for temperature compensation.

Another object of the invention is to provide such a transducer in which the compensating elements are not subject to applied strain which would influence their performance.

Still another object of the invention is to provide such a transducer in which the structure of the strain gages and compensating elements is quite simple, thereby facilitating quick and less expensive manufacture.

These objects are given only by way of example; thus, other desirable objectives and advantages inherently achieved by the disclosed invention may occur to those skilled in the art. Nonetheless, the scope of protection is to be limited only by the appended claims.

SUMMARY OF THE INVENTION

The above objects and other advantages are achieved with the invention which comprises, in one embodiment, a flexure element having at least one thin film strain gage resistance element deposited thereon in a position to be strained upon deformation of the flexure element. Leads of a material having a temperature coefficient of resistance opposite to that of the strain gage resistances are attached to the gages. Temperature compensation resistors are formed in the leads and deposited at a location on the flexure element which is unstrained during operation. A bridge of the strain gages is usually used. Due to the simplified process used to make the transducer, the leads are superposed on an underlying thin layer of the same material as the strain gage resistances.

As used in this application, the term "thin film" refers to elements of minute thickness which are deposited using sputtering or vacuum deposition techniques. The thickness of such films is typically measured in Angstrom units or microns so that several layers of such "thin films" may have a thickness of only 4 to 30 microns and an individual layer may have a thickness of about 200 Angstrom units to 1 micron. Such thin film elements are used in integrated circuits and are readily distinguishable from discrete elements or, as in the case of strain gages, from bonded gages or wire gages.

BRIEF DESCRIPTION OF THE DRAWING

FIG. 1 shows a greatly enlarged, perspective view of a flexure element having deposited thereon a temperature compensated strain gage bridge according to the present invention.

FIG. 2 shows a schematic diagram of the bridge illustrated in FIG. 1.

FIG. 3 shows a greatly enlarged cross-section taken along line 3—3 in FIG. 1, indicating portions of the individual thin films deposited to form the bridge strain gage resistances and electrical leads.

DETAILED DESCRIPTION OF A PREFERRED EMBODIMENT

The following is a detailed description of the invention, reference being made to the drawing in which like reference numerals identify like elements of structure in each of the several Figures.

Referring to FIGS. 1 to 3, a force transducer embodying the invention is seen to comprise a flexure beam or element 10 having an immovable portion 12 and a movable portion 14 joined by a flexible portion 16. Flexure element 10 typically is made from a resilient material such as steel in a rectangular parallelepiped configuration, as illustrated; however, any suitably resilient material may be used. Flexible portion 16 is formed by drilling or otherwise forming two holes 18,20 laterally through element 10, joining the holes with a slot 22, and opening hole 20 to the bottom of element 10 with a slot 24. Thus, when immovable portion 12 is fixed and a force is applied to movable portion 14 as indicated by the arrow in FIG. 1, the upper surface 26 of flexible portion 16 deforms into a curved configuration so that the thin section 28 above hole 18 is placed in tension; and the thin section 30 above hole 20 is placed in compression.

Four thin film strain gage resistance elements R1, R2, R3 and R4 are deposited on upper surface 26 in a manner to be described below, so that R1 and R3 are above thin section 28 and R2 and R4 are above thin section 30. FIG. 2 indicates schematically which strain gage resistance elements are in tension (T) and compression (C), and also shows their interconnection into a Wheatstone bridge pattern. Resistance elements $R_1$ and $R_4$ are connected at node 32 by thin film metal leads 34,36. A long thin film lead 38 runs from node 32 off movable portion 14, onto immovable portion 12 and to a serpentine thin film temperature compensation resistance element $R_{s1}$ which is of the same metal as lead 38. The other end of resistance element $R_{s1}$ joins a connector pad 40. A thin film lead 42 runs from resistance element R4 off movable portion 14, onto immovable portion 12 and to a serpentine thin film temperature compensation resistance element $R_{z1}$ which also is of the same metal as lead 42. The other end of resistance element $R_{z1}$ joins a second of connector pads 44. Resistance elements R1 and R2 are connected at node 46 by thin film metal leads 48,50. A long thin film lead 52 runs from node 46 to a connector pad 54 deposited on immovable portion 12. A thin film lead 56 runs from resistance element R2 to node 58 which is connected to resistance element R3 by thin film lead 60. A long thin film lead 62 runs from node 58 to a further serpentine thin film temperature compensation resistance element $R_{s2}$ deposited on immovable portion 12. The other end of resistance element $R_{s2}$ joins a connector pad 64. Finally, a long thin film lead 66 runs from resistance element R3 to a further serpentine thin film temperature compensation resistance element $R_{z2}$ deposited on immovable portion 12 and formed of the same metal as lead 66. Resistance element $R_{z2}$ terminates at a second of connector pads 68.

In FIG. 3, a schematic sectional view is shown, taken along line 3—3 of FIG. 1, next to resistance element R1. Resistance elements R1 to R4 and elements 32 to 68 preferably are deposited on flexure element 12 using a unique four layer structure and conventional photolithographic techniques to define resistor and lead geometries. Following suitable cleaning of flexure element 12, an electrically insulative layer 70, a resistive layer 72 and a conductive layer 74 are deposited seriatim on surface 26, so that the entire surface 26 is covered by three congruent layers. Then, using a suitable photomask, layer 74 is etched away to leave behind only those portions of layer 74 required for the lead pattern and temperature compensation resistance geometries discussed above. After that, using another suitable photomask, layer 72 is etched away to leave behind only resistance elements R1, R2, R3 and R4 joined to their respective leads. As shown in FIG. 3, each lead and temperature compensation resistance element actually is made up of two superposed thin films of congruent geometry, an upper metal film remaining from layer 74 and beneath it a lower resistive film remaining from layer 72. A passivation layer 76 preferably is applied over the entire gage assembly, following which through holes or vias (not shown), are etched through to connector pads 40, 44 (2), 54, 64 and 68 (2). The process of depositing the strain gage bridge is discussed in more detail in applicant's copending application Ser. No. 093,834, previously mentioned, which is incorporated by reference in the present application. Those skilled in the art will appreciate, however, that other processes of manufacture may also be used without departing from the scope of the present invention.

Insulative layer 70 may be formed of $TA_2O_5$; resistive layer 72, of conventional cermet material; and conductive layer 74, of gold. Other suitable materials may also be used such as alumina or Fosterite for insulative layer 70; Nichrome, MOSI or CRSI, for resistive layer 72; and nickel, for conductive layer 74. The temperature coefficient of resistance of the strain gage resistive material 72 is chosen to be of opposite polarity to that of the lead material 74.

In operation, as movable portion 14 is deflected upwardly due to applied force, the resistances of elements R1 to R4 will change due to the applied strain. Bridge power is applied across connector pads 40,64 and the bridge output is taken across connector pads 54 and 44-68, in the well-known manner. Should the temperature of the various resistances change from the level at which the transducer was calibrated, the resistance of elements R1 to R4 will change in one direction; and that of elements $R_{s1}$ and $R_{s2}$ and the elements of $R_{z1}$ and/or $R_{z2}$ (left in the circuit) will change in the opposite direction. The determining factor of whether $R_{z1}$ and $R_{z2}$ are left in the circuit or shorted out of the circuit during calibration depends on the zero setting calibration requirements. The changes in resistance $R_{s1}$ and $R_{s2}$ tend to maintain a relatively constant span or gage factor; whereas, the changes in $R_{z1}$ and/or $R_{z2}$ tend to maintain a relatively constant zero setting when no load is applied, even as temperature varies.

Resistances $R_{s1}$ and $R_{s2}$ are shown in the input circuit to the bridge; however, placing them in the output circuit is also within the scope of the invention. Similarly, resistances $R_{z1}$ and $R_{z2}$ are shown in series with the strain gage resistances in the legs of the bridge; but they could also be placed in parallel with the strain gage resistances and still be within the scope of the invention. Also, while serpentine geometries are shown for the temperature compensation resistances, this geometry is not critical, other arrangements being encompassed by the invention. For example, variation of the thickness of the gold layer to affect the compensation resistances is an alternate approach.

Having described my invention in sufficient detail to enable those skilled in the art to make and use it, I claim:

1. An improved thin-film strain gage transducer, comprising:
   a flexure element deformable in response to an applied force;
   a thin film of electrical insulator material deposited on said flexure element;
   at least one thin-film strain gage resistance element deposited on said insulator material on said flexure element in a position to be strained upon deformation of said flexure element, said strain gage resistance element being made from a first material having a first temperature coefficient of resistance;
   at least two electrically conductive thin-film leads deposited on said insulator material, said leads having a thin layer of said first material between said insulator material and said leads, and connected to said at least one thin-film strain gage resistance element for the purpose of conducting current to and from said resistance element, said thin-film leads being made from a second material having a second temperature coefficient of resistance opposite in algebric sign to that of said first material; and at least one thin-film temperature compensation resistance element deposited on said insulator material, and having a thin layer of said first material between said insulator material and said temperature compensation resistance element, connected in circuit with said leads and located in a position on said flexure element not subject to strain upon deformation of said flexure element, said temperature compensation element also being made from said second material, whereby changes in resistance of said strain gage resistance element due to temperature variations are offset by opposite changes in resistance of said temperature compensation resistance element thus rendering the transducer less sensitive to variations in ambient temperature.

2. A transducer according to claim 1, wherein there are at least four of said strain gage resistance elements connected in a Wheatstone bridge configuration; and said at least one thin film temperature compensation resistance is connected in the input power circuit of said bridge to provide temperature compensation of the span or gage factor of said bridge.

3. A transducer according to claim 2, wherein another thin film temperature compensation resistance is connected in at least one leg of said bridge to provide temperature compensation of the zero setting of said bridge.

4. A transducer according to claim 1, wherein there are at least four of said strain gage resistance elements connected in a Wheatstone bridge configuration; and said at least one thin film temperature compensation resistance is connected in at least one leg of said bridge to provide temperature compensation of the zero setting of said bridge 5. An improved thin-film strain gage transducer, comprising:

a flexure element having a portion deformable in response to an applied force;

at least one thin-film resistance element made of a first material having a first coefficient of resistance deposited on said deformable portion;

a pair of thin-film conductive leads made of a second material having a second coefficient of resistance opposite in algebraic sign of said first material, said leads connected to said resistance element at each end thereof to conduct an electrical current therethrough; and at least one thin-film temperature compensating element made of the same material as said thin-film lead, deposited on said flexure element on an unstressed portion of said flexure element and connected in circuit to at least one of said leads, said temperature compensating element having a serpentine configuration, whereby changes in resistance of said strain gage resistance element due to temperature variations are offset by opposite changes in resistance of said temperature compensation element thus rendering the transducer less sensitive to variations in ambient temperature.

6. A thin-film strain gage transducer as recited in claim 5, wherein said second material is metal.

* * * * *